UNITED STATES PATENT OFFICE.

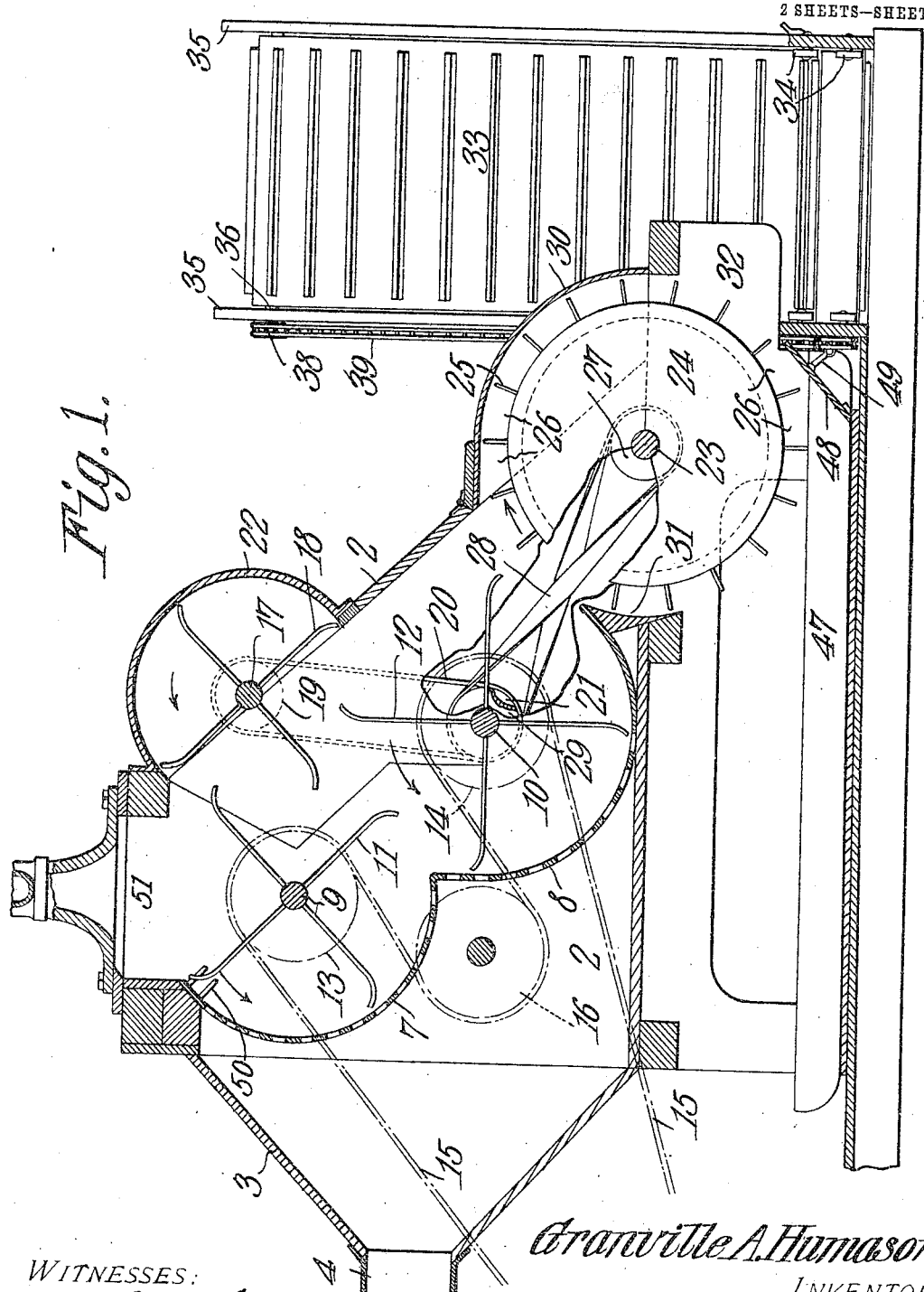

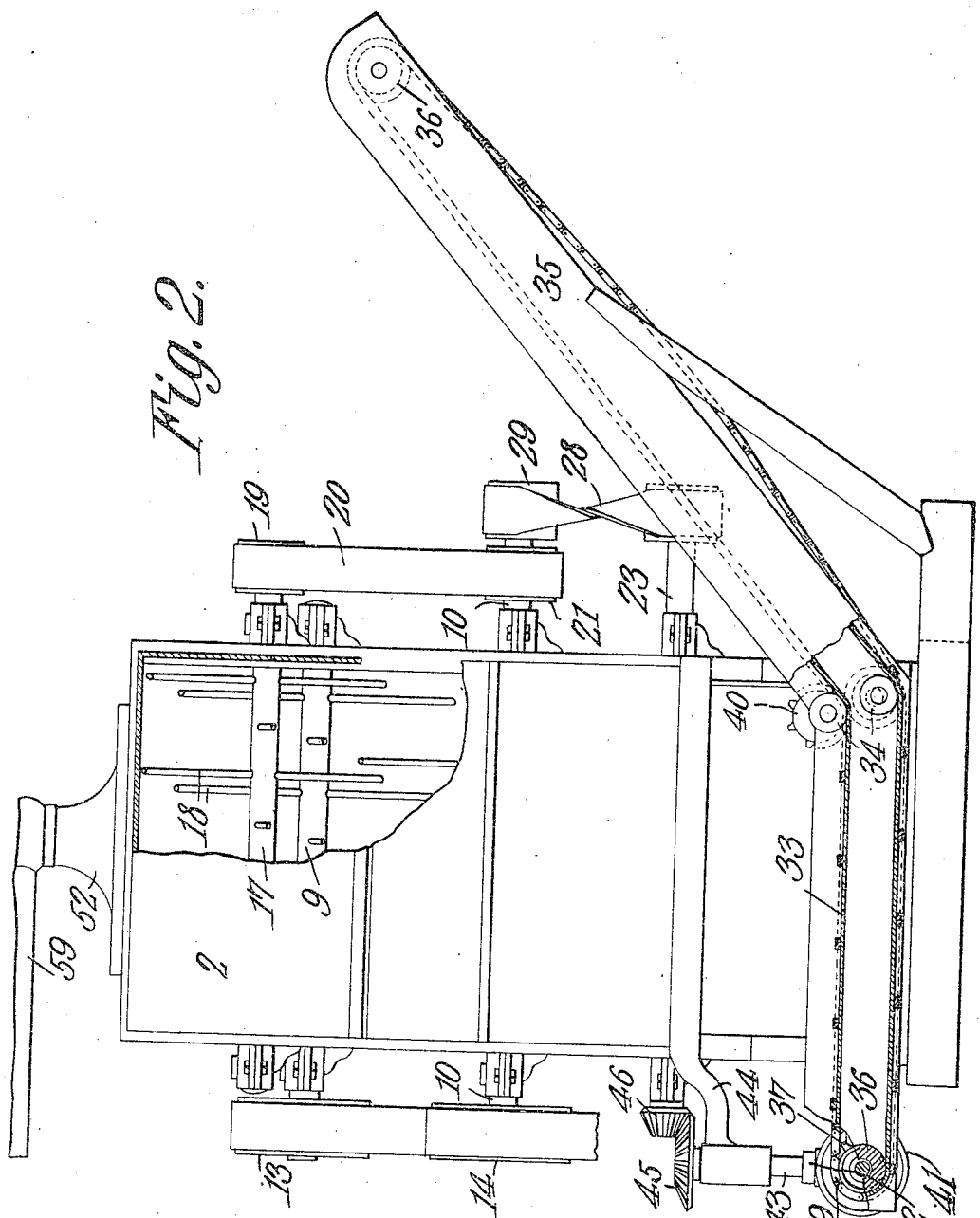

GRANVILLE A. HUMASON, OF NATCHEZ, MISSISSIPPI, ASSIGNOR OF ONE-THIRD TO ADAM MONROE BYRD, OF PHILADELPHIA, MISSISSIPPI, AND ONE-HALF TO ELLEN O. RIORDAN, OF WASHINGTON, DISTRICT OF COLUMBIA.

MACHINE FOR CLEANING COTTON.

959,746.  Specification of Letters Patent.  Patented May 31, 1910.

Application filed February 7, 1907, Serial No. 356,230. Renewed July 29, 1909. Serial No. 510,270.

*To all whom it may concern:*

Be it known that I, GRANVILLE A. HUMASON, a citizen of the United States, residing at Natchez, in the county of Adams and State of Mississippi, have invented a new and useful Machine for Cleaning Cotton, of which the following is a specification.

This invention relates to machines for cleaning cotton and its object is to provide a machine of this character having mechanism arranged in a novel manner to thoroughly separate the cotton so as to permit the effectual and quick removal of dust, trash, etc. from the cotton by pneumatic means, after which said cotton is discharged into a suitable receiver provided therefor.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a vertical longitudinal section through the cleaning and conveying mechanism. Fig. 2 is a rear elevation of the machine, a portion of the transverse conveyer and of the casing being shown in section.

Referring to the figures by characters of reference, 2 designates the casing of the machine, the front wall of which is flared or enlarged as at 3 and communicates with a suction flue 4 extending to a suitable fan not shown.

Arranged within the casing 2 and extending from the top to the bottom thereof are superposed screens 7 and 8 which are concave in cross section. These screens extend entirely across the line of suction through the flue 4. Arranged transversely within the casing and concentric with the screens 7 and 8 are shafts 9 and 10 each of which has beater arms 11 and 12 respectively extending therefrom, the ends of said arms being curved oppositely to the direction of movement of the arms. A pulley 13 is secured to one end of the shaft 9 and another pulley 14 is secured to the corresponding end of the shaft 10. These pulleys are rotated in the same direction by a belt 15 which is driven by a suitable motor and extends under an idler 16 which is disposed between the pulleys 13 and 14 as shown by dotted lines in Fig. 1. Another shaft 17 extends transversely within the casing 2 above the shaft 10 and carries beater arms 18 similar to the arms 11 and 12. A pulley 19 is secured on the shaft 17 and is driven by a belt 20 receiving motion from a pulley 21 on the shaft 10. A hood 22 is secured on the casing and is concentric with the shaft 17.

Extending through the lower rear portion of the casing 2 is a shaft 23 on which is secured a separating drum 24 having flights 25 radiating therefrom and forming pockets 26 therebetween. A pulley 27 is secured to one end of the shaft 23 and is driven by a twisted belt 28 extending over a pulley 29 on shaft 10. A shield 30 is hinged to the rear portion of the casing and extends over the drum and concentric therewith and a curved wall 31 is disposed concentric with the inner portion of the drum. The flights 25 which extend throughout the length of the drum 24 form practically air-tight connections with shield 30 and wall 31 so that suction established through the flue 4 is not seriously interfered with.

A cotton outlet 32 is located below the shield 30 and in rear of the drum 24 and extending under this outlet is the horizontal portion of an endless conveyer 33 which extends transversely of the machine and under guide rollers 34 and thence upward between inclined side boards 35. Rollers 36 are arranged at the extremities of the conveyer and have sprockets 37 and 38 rotatable therewith and engaging a chain 39. An idler sprocket 40 is disposed adjacent one end of each guide roller 34 for the purpose of holding the chain sufficiently taut. A bevel gear 41 rotates with the sprocket 37 and is driven by a gear 42 on a small shaft 43 which is journaled in a laterally projecting arm 44. Shaft 43 carries a gear 45 which receives a motion from a gear 46 on one end of shaft 23.

A trash flue or outlet 47 is formed under the separating drum 24 and extends forward therefrom under the casing 2. A cant board 48 is disposed at the rear end of this flue and adjacent the drum and is designed to be adjusted toward or from the drum in any desired manner as by means of a toggle 49.

A comb 50 extends inward from the upper portion of the upper screen 7 and is designed to coöperate with the beater 11. This comb is disposed below and adjacent the inlet 51 at the top of the casing and extending upward from this inlet is a tubular standard 52 constituting a receiver for picked cotton and designed to direct it into the casing 2 of the separator.

Suitable picking mechanism, one of the tubes 59 of which has been shown in Fig. 2, is connected to the standard 52 and when a suction is established through the machine and flue 4 by means of a fan as heretofore stated, cotton will be drawn through the picking mechanism and into the standard 52 from which it is carried onto the beater 11 which rapidly rotates and tears the cotton upon the comb 50. The cotton is then carried by the beater 11 downward over screen 7 where a portion of the dust, etc., contained therein is drawn outward through flue 4. Beater 18 drives the cotton from the beater 11 and onto the beater 12 which carries the cotton over the lower screen 8 where the cotton is again subjected to suction. The rapidly rotating drum 24 receives the cotton within the pockets 26 between the flights 25. During the passage of the cotton around this drum it finds its way to the outer ends of the pockets because it is heavier than any of the trash which may be commingled therewith. The cotton will therefore be thrown through the outlet 32 and onto the conveyer 34 whereas the trash within the pocket will be thrown into the flue 47. The accurate discharge of the trash into the flue is insured because an air current is set up over the cant board 48 and into the flue which is sufficient to draw the light trash into said flue.

It is to be understood that if preferred any suitable means may be placed within the inlet 51 for the purpose of crushing lumps of dirt and other useless material which may be commingled with the cotton. Said crushing means, however, must be of such a nature as not to interfere with the suction through the machine.

Instead of providing a transverse conveyer for receiving the cleaned cotton discharged through outlet 32 any other form of receiver may be employed.

Importance is attached to the provision of the flared end 3 which extends throughout the height of the two screens 7 and 8. The area of suction through the screens is therefore greatly increased and the clogging of the machine rendered less likely to occur. Another point to which importance is attached is the provision of the beater 18 above and between the beaters 11 and 12 inasmuch as this beater prevents the cotton from being thrown around the beaters 11 and 12 and renders the picking operation more efficient than where only the beaters 11 and 12 are utilized.

What is claimed is:

1. The combination with a casing having an inlet and an outlet, and a screen within the casing; of similar upper and lower beaters revolubly mounted above the screen and between the inlet and outlet, and an intermediate beater corresponding with and located above the first mentioned beaters, all of said beaters being revoluble in the same direction and along intersecting circles and disposed to produce a double stripping action upon material carried by the upper beater.

2. The combination with a casing, means for establishing suction therethrough, and a screen intersecting the line of suction, said casing having an outlet; of revoluble beaters coöperating with the screen and having radiating arms, a beater above and adjoining the first mentioned beaters and having radial arms, and means for simultaneously rotating all of the beaters in the same direction, the terminals of the arms of all the beaters describing intersecting circles, the arms of each beater being movable between the arms of the other beaters and constituting stripping means.

3. The combination with a casing, means for establishing suction therethrough, and a screen intersecting the line of suction, said casing having an outlet; of revoluble beaters coöperating with the screen and having radiating arms, a beater above and adjoining the first mentioned beaters and having radial arms, means for simultaneously rotating all of the beaters in the same direction, the terminals of the arms of all the beaters describing intersecting circles, the arms of each beater being movable between the arms of the other beaters and constituting stripping means, a separating drum mounted within the outlet to rotate in a direction opposite to that of the beaters and disposed to receive material from the beaters, and an endless conveyer for receiving and elevating material discharged by the drum.

In testimony that I claim the foregoing as my own, I have hereto affixed my signature in the presence of two witnesses.

GRANVILLE A. HUMASON.

Witnesses:
J. ROSS COLHOUN,
HERBERT D. LAWSON.